Inventor:
Joseph J. Ferro, Sr.
by Russell, Chittick & Pfund
Attorneys

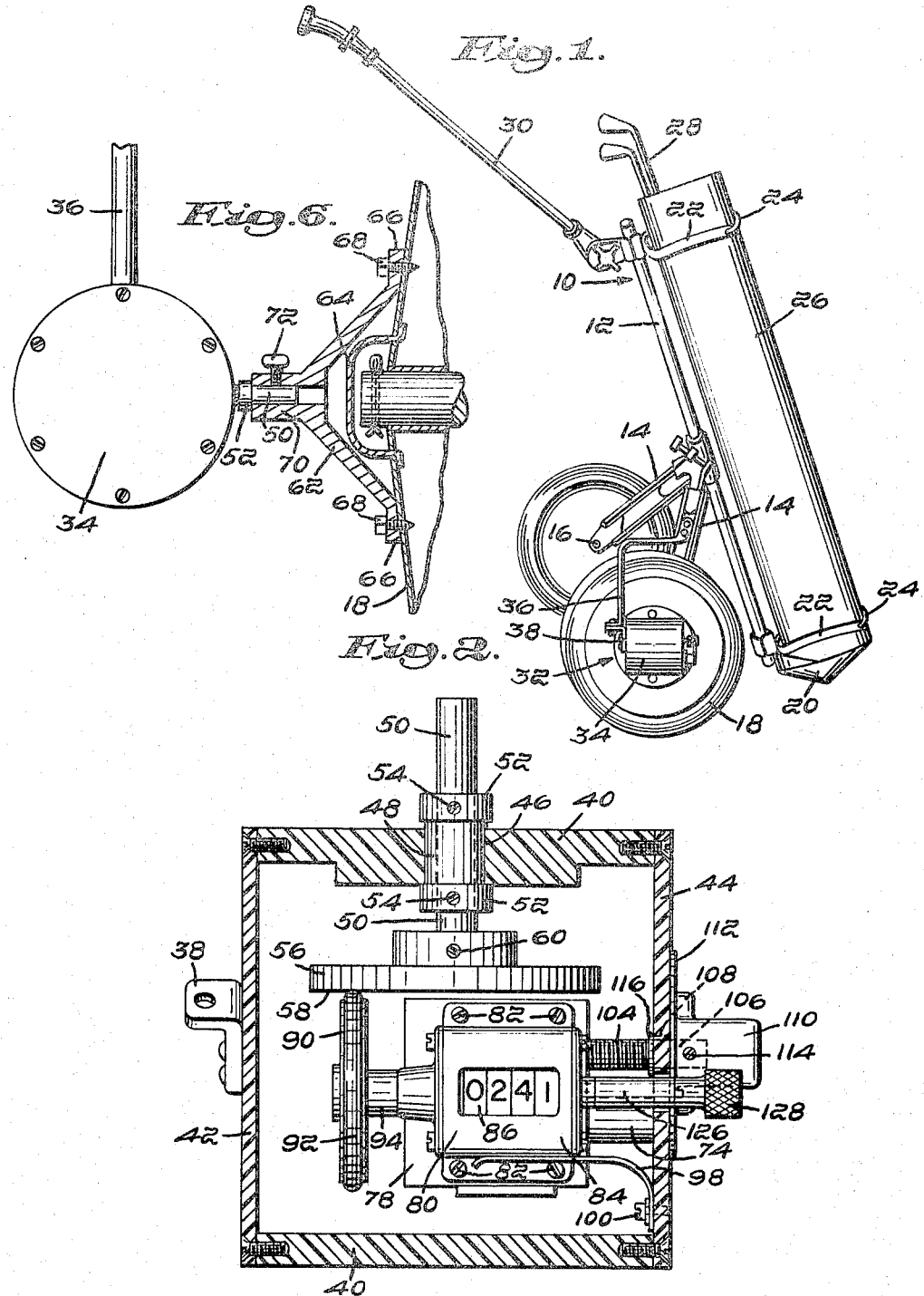

United States Patent Office 3,357,636
Patented Dec. 12, 1967

3,357,636
YARDAGE INDICATING APPARATUS
Joseph J. Ferro, Sr., 54 Kennard St.,
Malden, Mass. 02148
Filed Dec. 30, 1966, Ser. No. 606,179
9 Claims. (Cl. 235—95)

ABSTRACT OF THE DISCLOSURE

A device for measuring and indicating yardage traveled by a golf bag cart. The device has a simple adjustment to adapt it for use on any golf bag cart regardless of the diameter of its cart wheels. A shaft rotates with the cart wheel and carries at its other end a friction disk mounted parallel to the cart wheel. The yardage meter is driven by a drive wheel which rides on the face of the friction disk. The meter drive wheel is axially adjustable relative to the friction disk center so that the device can be set to produce one revolution of the meter drive wheel per each yard traveled by the cart wheel.

---

This invention relates to a yardage indicating apparatus for a golf bag carrying cart and the like, and more particularly to a yardage indicating apparatus which measures cart travel and has universal application to all golf carts regardless of the diameter of their ground-contacting wheels.

The need for an accurate yardage indicating apparatus for use on golf bag carts is well known. A golfer wants to know the distance his ball has traveled and the distance remaining to the green. Previous devices for measuring cart travel have generally employed complex mechanisms or were adapted for attachment on carts having but a single ground wheel diameter. However, since golf bag carts employ wheels having diameters ranging from about 4 inches up to about 16 inches, yardage indicating apparatus that can be used only on carts having but a single wheel diameter (or which can be adapted only by the substitution of mechanical parts) presents many problems in the marketing of such devices. Dealers prefer to stock one universal model to avoid the necessity of a large inventory. Furthermore, golfers prefer one universal model to avoid the necessity of complicated mechanical adjustments. Therefore, a need exists for a simple, yet accurate, yardage indicating apparatus which is designed to operate immediately upon installation regardless of the diameter of the cart wheel.

Accordingly, it is an object of this invention to provide a yardage indicating apparatus which accurately measures golf cart travel and which clearly exhibits the yardage traveled figure to the golfer.

It is another object of this invention to provide a yardage indicating apparatus which is adapted to be installed on all carts, regardless of the cart ground wheel diameter, and will operate accurately immediately after the golfer sets the dial on the apparatus wheel size selector.

It is another object of this invention to provide a yardage indicating apparatus which is simple and inexpensive to construct, sturdy in use, has all parts mounted within a weatherproof housing and is small in size.

Other objects and advantages of this invention will become apparent from a study of the accompanying drawings and descriptive matter in which is illustrated and described a preferred embodiment of my invention.

In the drawings:

FIG. 1 is a view in perspective of a conventional golf bag cart on which a golf bag has been secured. The yardage indicating apparatus embodying the invention is mounted outboard of one of the cart ground wheels;

FIG. 2 is a top plan view of the yardage indicating apparatus with the housing in section to show the internal parts;

FIG. 6 is an end elevation, partly in section, of the adapting means for coupling the yardage indicating apparatus to the cart ground wheel.

Figure 3:
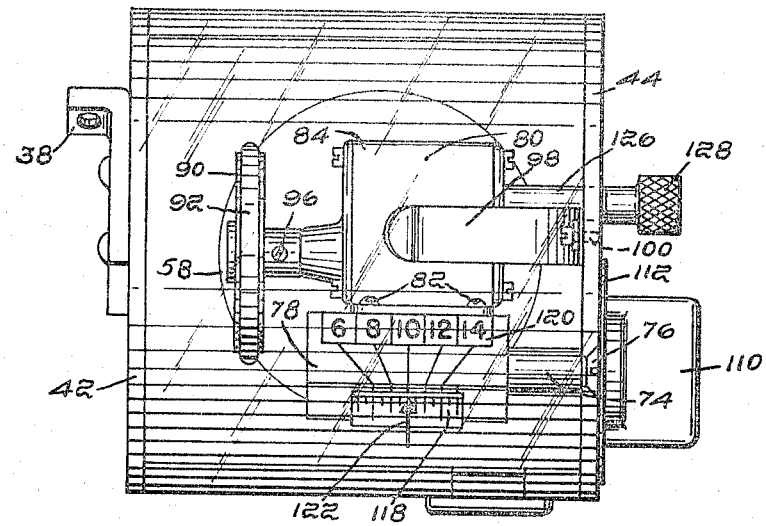
FIG. 3 is a side elevation of the yardage indicating apparatus shown in FIG. 2.
Figure 4:
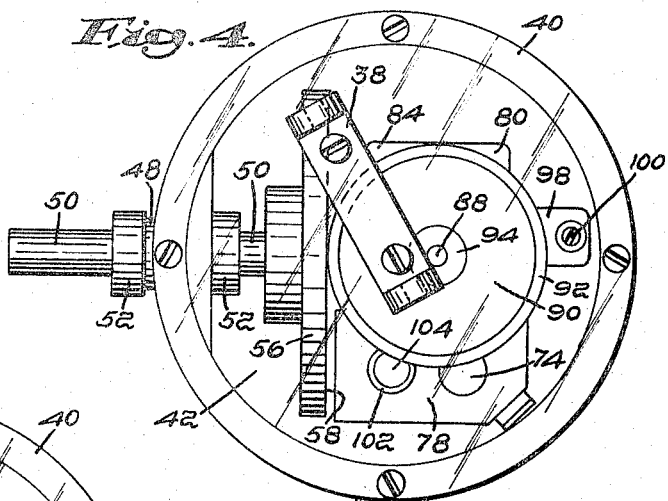
FIG. 4 is an end elevation of the yardage indicating apparatus shown in FIG. 3.
Figure 5:
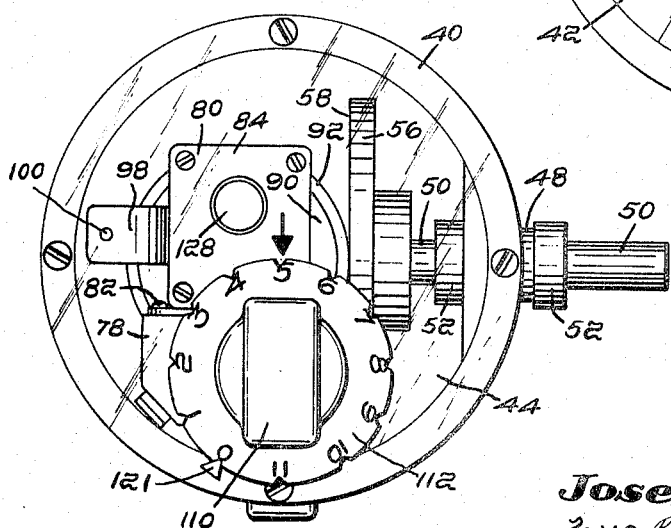
FIG. 5 is an elevation of the opposite end of the yardage indicating apparatus shown in FIG. 3.

Referring now more particularly to the drawings, FIG. 1 illustrates a conventional golf cart 10 having a tubular frame 12. Folding legs 14 are pivotally attached at their upper ends to frame 12 and mount stub axles 16 at their lower ends. Ground-engaging cart wheels 18 are preferably fitted with ball bearings in their hubs and are rotatably carried on stub axles 16.

Tubular frame 12 is fitted with a bag support plate 20, upper and lower bag straddling arms 22 and retaining straps 24 which cooperate to securely carry golf bag 26 and golf clubs 28. An adjustable handle 30 is pivotally mounted at the upper end of tubular frame 12 to facilitate pulling of the golf cart by the golfer.

The yardage indicating apparatus embodying my invention is generally indicated by arrow 32. Apparatus 32 in its preferred form has a hollow cylindrical housing 34 which is fixed in position outboard of one of the cart wheels 18 by a stabilizing arm 36. Arm 36 is attached to a housing bracket 38 and to any fixed cart member, such as leg 14.

Referring now to FIG. 2, the transmission system for transmitting cart wheel travel to the revolution counter will be described. Hollow housing 34 is formed by an open-ended cylinder 40 and two end plates 42 and 44 which are screw fastened to cylinder 40. An opening 46 is provided in a thickened portion of housing cylinder 40. A sleeve bearing 48 is press-fit into opening 46 and a short transmission shaft 50 is inserted through sleeve 48 and rotatably carried therein. Shaft 50 extends from the exterior to the interior of housing 34 and is restrained from longitudinal displacement by shaft collars 52 which are held in place on shaft 50 by set screws 54. A stepped transmission disk 56 having a friction-producing grainy face 58 is seated on the interior end of transmission shaft 50 and is fixed thereto by a set screw 60.

As can be most clearly seen in FIG. 6, the exterior end of transmission shaft 50 is adapted to be inserted into a coupling unit 62 which is affixed to cart ground wheel 18. The coupling unit 62 is preferably conical in shape and is sufficiently hollow to fit over cart ground wheel axle cap 64. The rim 66 of coupling unit 62 is provided with apertures through which sheet metal screws 68 threadably engage ground wheel 18. If ground wheel 18 is spoked instead of solid as illustrated, pairs of bolts can be substituted for screws 68. The bolts are positioned so that each pair straddles a spoke and is locked thereto by a small threaded backing plate which spans and engages the bolts on the other side of the spoke from rim 66. Coupling unit 62 is provided with an axially bored hub 70 in which a small aperture is formed to threadably receive thumb screw 72.

To install the yardage indicating apparatus 32 on golf cart 10, coupling unit 62 is attached to ground wheel 18, transmission shaft 50 is inserted into hub 70 and thumb screw 72 is screwed tight. Stabilizing arm 36 is then bolted to housing bracket 38 and to cart leg 14. It will now be understood that after the described installation, movement of the cart ground wheel 18 causes transmission disk 56 to rotate within housing 34. The housing 34, meanwhile, is fixed in position by stabilizing arm 36.

Referring now to FIGS. 2-5, the revolution counting mechanism and its operation will be described. A large guide pin 74 is fixed to the inner surface of housing end plate 44 by screw fastener 76. A support block 78 is laterally bored to receive guide pin 74 and to pivot about it. Support block 78 has a flat upper surface upon which a conventional revolution counting and indicating mechanism 80 is mounted by screws 82. Revolution counter 80 has a housing 84 containing its operating parts, a window 86 in housing 84 displaying the revolution count and a drive shaft 88. It is the rotations of drive shaft 88 which are counted by mechanism 80 and that count is displayed through window 86. A drive wheel 90 having a resilient, friction-producing peripheral surface 92, is press-fit on a flanged sleeve bearing 94 which is fixed to drive shaft 88 by set screw 96.

A strip of spring steel 98 is mounted on the interior surface of housing end plate 44 by screw fastener 100. Spring strip 98 is resilient and positioned to contact revolution counter housing 84 to continuously urge drive wheel peripheral surface 92 against transmission disk friction face 58. Transmission shaft 50 and drive shaft 88 are in the same plane and transmission disk 56 and drive wheel 90 are disposed at right angles. This arrangement results in the achievement of maximum adhesion between disk 56 and wheel 90 at their point of rolling contact.

It will be understood that the turning of cart ground wheel 18 causes a corresponding angular rotation of transmission disk 56 via transmission shaft 50. Since peripheral surface 92 of drive wheel 90 rolls on friction face 58 of transmission disk 56, the angular rotation of drive wheel 90 is regulated by the radial distance between the center of transmission disk 56 and the point of rolling contact between disk 56 and drive wheel 90.

To selectively alter this radial distance, means are provided to adjustably move support block 78 laterally. A threaded bore 102 is formed in support block 78 and a threaded shaft 104 is inserted therein. Threaded shaft 104 has an unthreaded end 106 which extends through an over-sized aperture 108 in housing end plate 44. A rotatable knob 110 having a graduated dial 112 fixed thereto is seated on shaft end 106 and locked in place by set screw 114. A washer 116 having an opening slightly smaller than the thread diameter is carried by shaft end 106 and bears against the interior surface of housing end plate 44 in cooperation with dial 112 to anchor shaft 104 against longitudinal movement while permitting the shaft to be turned by knob 110. It will thus be seen that rotation of knob 110 turns threaded shaft 104 which coacts with threaded bore 102 to move support block 78 laterally. This causes drive wheel 90 to move across the friction face 58 of transmission disk 56.

The purpose of providing for the selective placement of drive wheel 90 on transmission disk 56 relative to the center of the disk is to ensure that drive wheel 90 makes one complete revolution for each yard traveled by golf cart 10. In other words, since a ten inch diameter ground wheel 18 will revolve a greater angular amount per yard of cart travel than will a twelve inch diameter ground wheel, an adjustment must be made in the transmission train to produce exactly one drive wheel revolution per yard of golf cart travel. Obviously, in countries employing the metric or some other system of length measurement, drive wheel 90 should be adjusted on transmission disk 56 relative to the center of the disk to ensure that drive wheel 90 makes one complete revolution for each meter, etc. traveled by golf cart 10.

To simplify the correct installation of yardage indicating apparatus 32 on golf cart 10, a wheel size scale 118 is provided on support block 78 and a legend 120 appears adjacent thereto to identify the scale range of sommonly employed ground wheel diameters. An indicating arrow 122 is inscribed on a transparent portion of housing 34. As the golfer turns knob 110, scale 118 will move under indicatig arrow 122 to re-position drive wheel 90 for a particular cart wheel size. In FIG. 3, the mechanism is correctly set for a golf cart having a ten inch wheel diameter. Once the correct wheel size setting has been dialed, the knob 110 is locked in position by a spring-loaded locking finger 124 which seats itself in the selected peripheral recess formed in knob dial 112. It will be noted that dial 112 is divided into twelve parts each part being provided with a locking recess. This feature increases the flexibility and and accuracy of the apparatus 32 since it provides additional dial settings for carts having odd sized wheel diameters.

Revolution counter 80 is also provided with a reset mechanism. A shaft 126 extends from counter housing 84 through an oversized opening in housing end plate 44. A knurled reset knob 128 is fixed on the free end of shaft 126 and rotates to reset the yardage count in window 86 to zero.

In operation, the golfer first installs coupling unit 62 on the cart ground wheel 18 with sheet metal screws 68 (or bolts for spoked wheels). Transmission shaft 50 of apparatus 32 is then inserted into the bore of hub 70 and thumb screw 72 is turned tight. Stabilizing arm 36 is then bolted at its lower end to housing bracket 38 and at its upper end to cart leg 14. This installation fixes housing 34 in position and allows transmission shaft 50 to revolve with cart ground engaging wheel 18.

To properly calibrate apparatus 32 to record and indicate the correct yardage traveled by golf cart 10, the golfer measures the diameter of his cart wheel 18 and then turns knob 110 until indicating arrow 122 registers with the desired wheel size line on scale 118. This completes the installation. A field test should be made to ensure the accurate performance of apparatus 32. If the diameter of ground wheel 18 was incorrectly measured, a simple resetting of knob 110 will correct the error.

In conclusion, it will be understood that my invention has been described with reference to a preferred embodiment. Obviously, many modifications and variations of the preferred embodiment are possible in light of the above teachings. Therefore, this invention is not limited to the details of the described construction, but is limited only by the scope and spirit of the appended claims.

I claim:

1. For use in combination with a golf bag cart and the like having a ground wheel of any diameter, a yardage indicating apparatus comprising:
    (a) a hollow housing fixed with relation to the golf bag cart having an opening in one of its walls;
    (b) a transmission shaft axially fixed to the golf cart ground wheel, said transmission shaft extending through and mounted for rotation in said housing wall opening;
    (c) a transmission disk fixed to said transmission shaft within said housing, said transmission disk axially spaced from and positioned parallel to the golf cart ground wheel;
    (d) a revolution counting mechanism mounted within said housing and having a count indicator visible exteriorly of said housing, said counting mechanism having an actuating drive wheel positioned to ride on the face of said transmission disk; and
    (e) selective means for repositioning said drive wheel upon said transmission disk face at different distances from the disk face center to establish a transmission relationship whereby one unit of cart ground wheel travel produces one revolution of said drive wheel.

2. Apparatus of claim 1 wherein said actuating drive wheel is oriented at a substantially right angle to the transmission disk face and the surfaces of said drive wheel periphery and said transmission disk face are sufficiently friction-producing to prevent slippage therebetween.

3. Apparatus of claim 1 wherein said selective means for repositioning said drive wheel upon said transmission disk face includes a support block upon which said revolution counting mechanism is mounted and adjustable means for drawing said support block parallel to said transmission disk face.

4. Apparatus of claim 3 wherein said adjustable drawing means includes a shaft coupled to said support block, said shaft extending exteriorly of said housing and having screw means responsive to manual rotation of its exterior shaft end for drawing said support block in a direction parallel to the shaft axis.

5. Apparatus of claim 1 wherein said selective means for repositioning said drive wheel includes a calibrated scale fixed relative to said revolution counter drive wheel and a fixed arrow on said housing, said scale and said arrow being relatively movable to indicate drive wheel position and correlative cart wheel size.

6. Apparatus of claim 1 wherein said revolution counting mechanism has reset means for returning the indicated count to zero.

7. Apparatus of claim 1 further characterized by means for continuously urging said drive wheel into contact with the face of said transmission disk.

8. Apparatus of claim 1 further characterized by a coupling unit having fastening means for fixedly engaging the golf cart ground wheel and further having fastening means for fixedly engaging said transmission shaft.

9. Apparatus of claim 1 wherein said selective means for repositioning said drive wheel includes a shaft engaging the counting mechanism support, said shaft extending exteriorly of said hollow housing and provided at its exterior end with manual control means for moving said counting mechanism support in a direction parallel to said transmission disk face, a scale on said movable counting mechanism support and an arrow fixed on said housing, the alignment of said scale and arrow indicating drive wheel position and the particular cart wheel diameter which produces one drive wheel revolution per yard of cart ground wheel travel.

References Cited

UNITED STATES PATENTS

| 1,052,496 | 2/1913 | McClelland | 73—529 |
| 1,451,923 | 4/1923 | Pierce | 73—529 |
| 1,647,500 | 11/1927 | Brant et al. | 73—529 |
| 2,511,104 | 6/1950 | Eddy | 346—31 |
| 2,766,935 | 10/1956 | Klein | 234—95 |

FOREIGN PATENTS 46,099   1/1911   Austria.

RICHARD B. WILKINSON, *Primary Examiner.*

STEPHEN J. TOMSKY, *Examiner.*

S. A. WAL, *Assistant Examiner.*